US012729665B2

(12) United States Patent
Shaik

(10) Patent No.: US 12,729,665 B2
(45) Date of Patent: Sep. 8, 2026

(54) WIND HARNESS FOR A VEHICLE

(71) Applicant: FCA US LLC, Auburn Hills, MI (US)

(72) Inventor: Azad Mohammed Shaik, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 344 days.

(21) Appl. No.: 18/542,945

(22) Filed: Dec. 18, 2023

(65) Prior Publication Data

US 2025/0198383 A1 Jun. 19, 2025

(51) Int. Cl.
*F03D 9/32* (2016.01)
*B62D 25/04* (2006.01)

(52) U.S. Cl.
CPC ............... *F03D 9/32* (2016.05); *B62D 25/04* (2013.01); *F05B 2240/941* (2013.01)

(58) Field of Classification Search
CPC ..... F03D 9/32; B62D 25/04; F05B 2240/941; B60L 8/006; B60L 53/52; B60K 2016/006; B60R 16/0307
See application file for complete search history.

(56) References Cited

U.S. PATENT DOCUMENTS 4,423,368 A * 12/1983 Bussiere .................. F03D 9/32 180/2.2
5,680,032 A 10/1997 Pena
5,850,108 A 12/1998 Bernard
6,897,575 B1 5/2005 Yu
7,135,786 B1 11/2006 Deets
7,492,053 B2 2/2009 Fein et al.
7,652,389 B2 1/2010 Farmer
7,665,553 B2 2/2010 Tabe
7,665,554 B1 2/2010 Walsh
7,789,182 B2 9/2010 Bradley et al.
7,808,121 B1 10/2010 Glynn
7,868,476 B2 1/2011 Baca et al.
8,098,040 B1 1/2012 Botto
8,253,262 B1 8/2012 Kiler
8,371,401 B1 2/2013 Illustrato
8,436,485 B1 5/2013 Smith
8,710,691 B2 4/2014 Haddad
8,791,586 B2 7/2014 Ortiz et al.
8,967,302 B2 3/2015 Tran
9,103,317 B2 8/2015 Garcia
2002/0153178 A1 10/2002 Limonius
2003/0155464 A1 8/2003 Tseng
(Continued)

FOREIGN PATENT DOCUMENTS

FR 2879970 A1 * 6/2006 ............. F03D 13/20
WO WO-2023234810 A1 * 12/2023 ............. H02S 20/30

OTHER PUBLICATIONS

PE2E English Translation of FR-2879970-A1 (Year: 2006).*

*Primary Examiner* — Nicholas McFall
*Assistant Examiner* — Eric Acosta
(74) *Attorney, Agent, or Firm* — Jeremy J. Klobucar

(57) ABSTRACT

A wind harness for a vehicle includes a low profile duct intake that extends along a roof and sides of a vehicle. At least one duct extends from the duct intake on each side of the vehicle. The ducts are positioned in the rear pillars directing air and through along the pillars. A wind turbine is positioned inside a body panel of the vehicle. The ducts have an exhaust nozzle directed at the turbine for delivering an air flow to rotate the turbine.

8 Claims, 1 Drawing Sheet

(56) References Cited

U.S. PATENT DOCUMENTS

| | | | |
|---|---|---|---|
| 2004/0084908 | A1 | 5/2004 | Vu |
| 2007/0108775 | A1 | 5/2007 | McDavid, Jr. |
| 2007/0163829 | A1 | 7/2007 | Ellis |
| 2011/0031043 | A1 | 2/2011 | Armani et al. |
| 2011/0100731 | A1 | 5/2011 | Hassan |

* cited by examiner

WIND HARNESS FOR A VEHICLE

FIELD

The present disclosure relates to vehicles and, more particularly, to a wind harness utilizing wind to produce electrical energy.

BACKGROUND

This section provides background information related to the present disclosure which is not necessarily prior art.

In automotive vehicles, when they are moving, they are constantly exposed to a wind force. Ordinarily, as the vehicle speed increases, the force of the wind on and around the vehicle increases. Thus, there is wind present at a significant speed on the vehicle. Thus, it would be desirable to utilize the wind speed and force to generate electricity via a wind turbine. Several different types of electrical generation devices have been provided in the art. However, these devices have drawbacks when applying them to the vehicle to generate electricity.

Thus, it would be desirable to utilize the wind force hitting the vehicle and harnessing the wind to generate electricity. Accordingly, the present disclosure provides a wind harnessing device.

The present device provides a wind harness having openings in the back roof of the vehicle. The harness may project to the left and right sides of the vehicle to enable the wind to flow into the harness. The wind harness runs wind turbines when the car is moving so that the air flows through the harness and generates electricity via a wind turbine.

SUMMARY

This section provides a general summary of the disclosure, and is not a comprehensive disclosure of its full scope or all of its features.

According to a first aspect of the disclosure, a vehicle wind harness comprises a low profile intake extending along a roof and sides of a vehicle. At least one duct extends from an intake on each side of the vehicle. The ducts are positioned in the rear pillars to direct the airflow along the pillars. A wind turbine is positioned inside a body panel of the vehicle. The ducts have an exhaust directed at the wind turbine to rotate the turbine to produce electricity. A plurality of ducts may be on each side of the vehicle. The intake is part of the roof panel. The intake extends 3 cm to 6 cm above the roof and sides of the vehicle. The air exits the panels below the vehicle.

According to a second aspect of the disclosure, a vehicle with a wind harness comprises a roof with side pillars connecting the roof to a body. A vehicle wind harness has a low profile intake extending along the roof and sides of the vehicle. At least one duct extends from an intake on each side of the vehicle. The ducts are positioned in the rear pillars to direct the airflow along the pillars. A wind turbine is positioned inside a body panel of the vehicle. The ducts have an exhaust directed at the wind turbine to rotate the turbine to produce electricity. A plurality of ducts may be on each side of the vehicle. The intake is part of the roof panel. The intake extends 3 cm to 6 cm above the roof and sides of the vehicle. The air exits the panels below the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
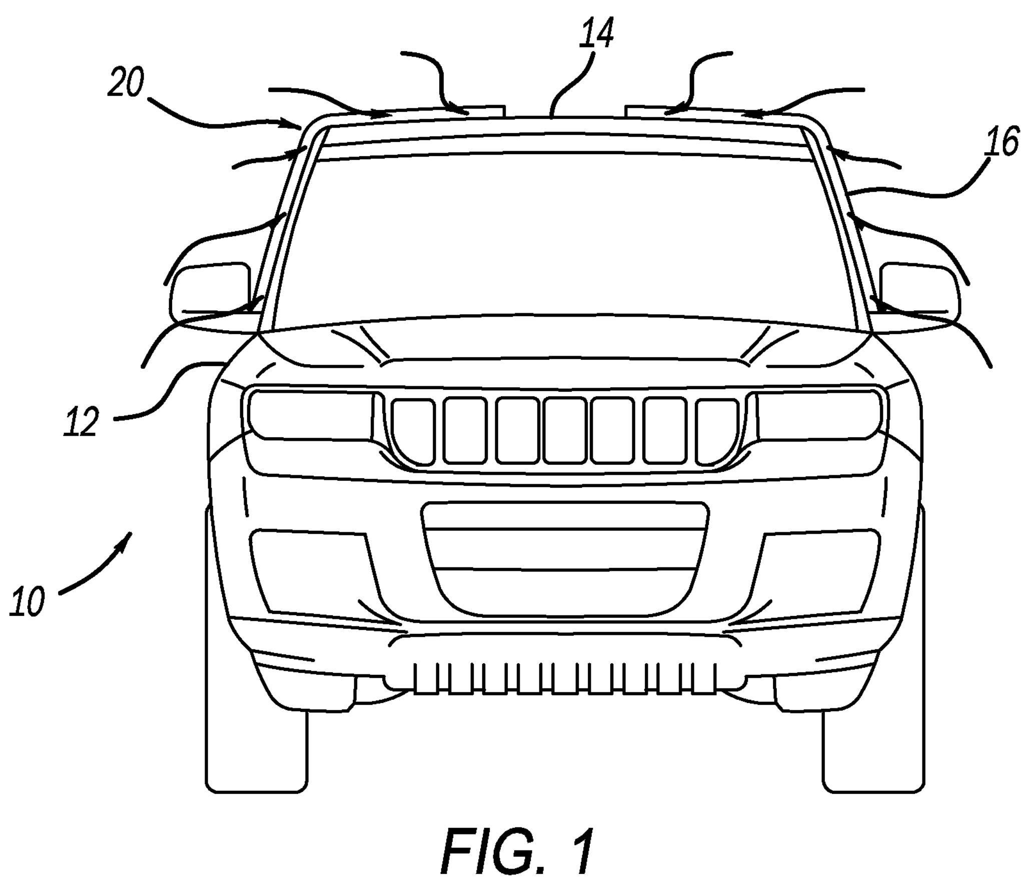
FIG. 1 is a schematic elevation view of a vehicle with a wind harness.
Figure 2:
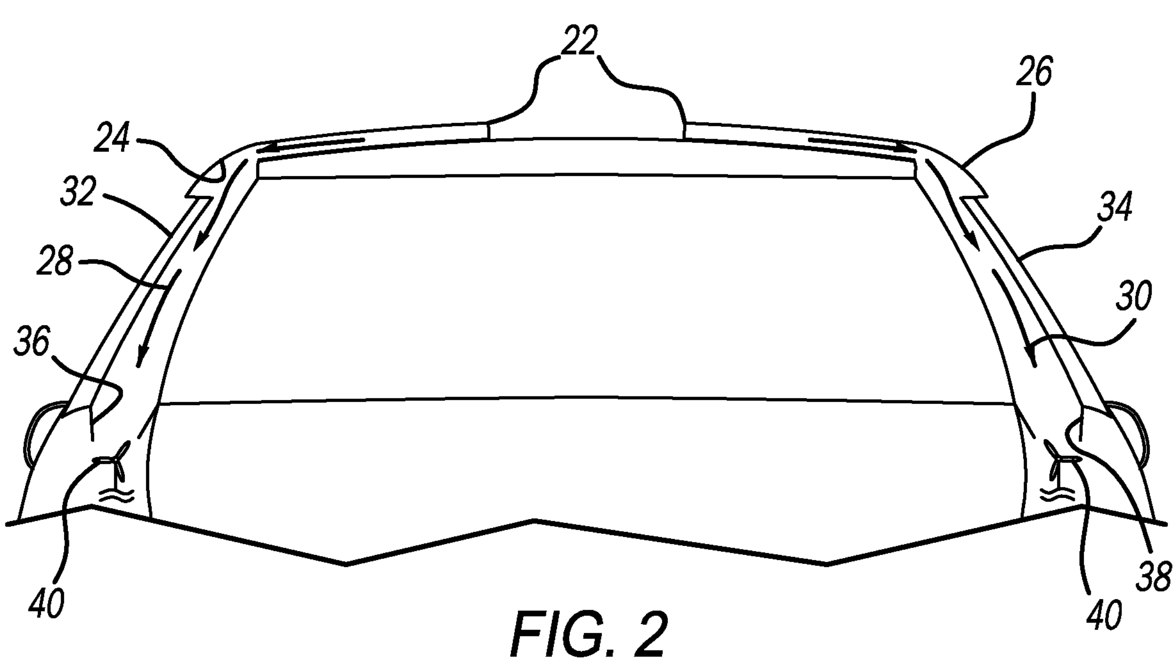
FIG. 2 is a schematic view of the wind harness in the vehicle.

Example embodiments will now be described more fully with reference to the accompanying drawings.

Turning to the figures, a vehicle is illustrated and designated with the reference numeral 10. The vehicle 10 includes a body 12 with a roof panel 14. The roof panel 14 is continuous with the body via the side pillars 16. A wind harness 20 is integrated into the roof 14.

The harness 20 includes roof ducts 22 and side ducts 24, 26. The roof duct 22 may extend continuously across the roof or it may be divided into portions as shown. The roof duct 22 and side ducts 24, 26 are low profile and extend about 3 cm to 6 cm from the roof and side pillars.

The roof duct 22 and side ducts 24, 26 include intakes to direct the airflow into channels 28, 30, respectively. The channels 28, 30 are positioned inside of the pillars 32, 34. The channels 28, 30 include exhaust exits 36, 38. The exhaust exits 36, 38 form a nozzle to direct the air flow to the wind turbines 40. The wind turbines 40 are positioned inside of the vehicle body 12. Thus, as the airflow is directed from the channels 28, 30 through the exhaust exits 36, 38 toward the turbines 40, the turbines 40 rotate and, in turn, generate electrical energy. The energy can be passed onto the vehicle batteries. After the air flow passes by the turbines 40, it is directed out of the vehicle, preferably underneath it.

Thus, the wind or air enters the duct intakes and is directed through the channel 28, 30 to the turbines 40. This directs the air while driving the turbines 40 which, in turn, generates electricity. The harness 20 with the ducts 22, 24, 26 may be built into the roof panel 14 and side panels 16 of the vehicle 10. Thus, the low profile of the ducts 22, 24, 26 enables an air collection of the laminate flow as it passes along the body 12. This air flow is, in turn, moved into the channel 28, 30 and directed through the exhaust nozzles 36, 38 to the turbines 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wind harness for a vehicle comprising:

a low profile duct intake extending along a roof and sides of a vehicle;

at least one duct extending from the duct intake on each side of the vehicle, the ducts directing a flow of air into channels positioned in the rear pillars directing the air along and inside the pillars;

a wind turbine is positioned inside a body panel of the vehicle, the channel including an exhaust directed at the turbine for directing the air at the turbine to rotate the turbine, wherein a width of the channels as the channels extend through the rear pillars continuously increases before being narrowed by the exhausts that define a nozzle for directing the air at the turbine to rotate the turbine.

2. The wind harness for a vehicle of claim 1, wherein a plurality of ducts are on each side of the vehicle.

3. The wind harness for a vehicle of claim 1, wherein the ducts are part of the roof.

4. The wind harness for a vehicle of claim 1, wherein the duct intakes extend 3 cm to 6 cm above the roof and sides of the vehicle.

5. A vehicle with a wind harness comprising:

a roof with side pillars connecting the roof to a body;

a low profile duct intake extending along a roof and sides of a vehicle;

at least one duct extending from the duct intake on each side of the vehicle, the ducts direct a flow of air into channels positioned in the rear pillars directing the air along and inside the pillars;

a wind turbine positioned inside a body panel of the vehicle, the channels each including an exhaust directed at the turbine for directing the air at the turbine to rotate the turbine, wherein a width of the channels as the channels extend through the rear pillars continuously increases before being narrowed by the exhausts that define a nozzle for directing the air at the turbine to rotate the turbine.

6. The vehicle with a wind harness of claim 5, wherein a plurality of ducts are on each side of the vehicle.

7. The vehicle with a wind harness of claim 5, wherein the ducts are part of the roof.

8. The vehicle with a wind harness of claim 5, wherein the duct intakes extend 3 cm to 6 cm above the roof and sides of the vehicle.

* * * * *